United States Patent
Tanaka et al.

(10) Patent No.: US 7,900,083 B2
(45) Date of Patent: Mar. 1, 2011

(54) DISK ARRAY APPARATUS, DISK ARRAY CONTROL METHOD AND DISK ARRAY CONTROLLER

(75) Inventors: Kiyoshi Tanaka, Kawasaki (JP); Fumio Hanazawa, Kawasaki (JP); Akira Sanpei, Kawasaki (JP); Hiroaki Sato, Kawasaki (JP); Keiju Takizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 12/289,214

(22) Filed: Oct. 22, 2008

(65) Prior Publication Data
US 2009/0217086 A1 Aug. 27, 2009

(30) Foreign Application Priority Data
Feb. 27, 2008 (JP) ................. 2008-45451

(51) Int. Cl.
*G06F 11/00* (2006.01)
(52) U.S. Cl. ............ 714/5; 714/7; 714/8; 714/47
(58) Field of Classification Search ........ 714/5, 714/7, 8, 47
See application file for complete search history.

(56) References Cited

U.S. PATENT DOCUMENTS

| | | | | |
|---|---|---|---|---|
| 5,588,012 A * | 12/1996 | Oizumi | ......... | 714/805 |
| 5,611,069 A * | 3/1997 | Matoba | ......... | 711/114 |
| 5,758,057 A * | 5/1998 | Baba et al. | ......... | 714/7 |
| 6,397,347 B1 * | 5/2002 | Masuyama et al. | ......... | 714/5 |
| 7,389,379 B1 * | 6/2008 | Goel et al. | ......... | 711/112 |
| 7,779,306 B1 * | 8/2010 | Philbin et al. | ......... | 714/43 |
| 2002/0002440 A1 * | 1/2002 | Sakai | ......... | 702/35 |
| 2002/0038436 A1 * | 3/2002 | Suzuki | ......... | 714/6 |
| 2002/0162057 A1 * | 10/2002 | Talagala | ......... | 714/54 |
| 2002/0169996 A1 * | 11/2002 | King et al. | ......... | 714/8 |
| 2002/0191537 A1 * | 12/2002 | Suenaga | ......... | 370/221 |
| 2004/0042408 A1 * | 3/2004 | Sakai | ......... | 370/241 |
| 2004/0051988 A1 * | 3/2004 | Jing et al. | ......... | 360/31 |
| 2004/0205381 A1 | 10/2004 | Sakai | | |
| 2005/0114728 A1 * | 5/2005 | Aizawa et al. | ......... | 714/6 |
| 2006/0069947 A1 * | 3/2006 | Takahashi et al. | ......... | 714/6 |
| 2006/0117216 A1 * | 6/2006 | Ikeuchi et al. | ......... | 714/6 |
| 2008/0010547 A1 * | 1/2008 | Nakashima et al. | ......... | 714/43 |
| 2010/0199131 A1 * | 8/2010 | Yoshida | ......... | 714/54 |

FOREIGN PATENT DOCUMENTS

| | | |
|---|---|---|
| JP | 6-51914 | 2/1994 |
| JP | 10-275060 | 10/1998 |
| JP | 11-296311 | 10/1999 |
| JP | 2004-252692 | 9/2004 |

* cited by examiner

*Primary Examiner*—Robert Beausoliel
*Assistant Examiner*—Joshua P Lottich
(74) *Attorney, Agent, or Firm*—Staas & Halsey LLP

(57) ABSTRACT

An error table stores information indicating the occurrence of an error. A statistical score addition table stores the number of scores for disk or path according to the error. A control unit adds the first number of scores to the error disk. Also, when the information indicating the occurrence of the error is not stored in the error table, the control unit adds the second number of scores smaller than the first number of scores to the path to the error disk, while when the information is stored, the control unit adds the third number of scores larger than the first number of scores to the path. The control unit separates the path or disk of which the number of scores exceeds a threshold from the disk array apparatus.

9 Claims, 9 Drawing Sheets

FIG. 3A

```
DE[0].bitmap = (0000000000000000)b = (0000)h
DE[1].bitmap = (0000000000000000)b = (0000)h
DE[2].bitmap = (0000000000000000)b = (0000)h
```
⟵ 24

```
PATH    P1      P2    P3    P4    P5    P6    P7
        [  0]  [  0][  0][  0][  0][  0][  0]
Disk    D00    D01   D02   D03   D04   D05   D06   D07   D08   D09   D0A   D0B
        [  0]  [  0][  0][  0][  0][  0][  0][  0][  0][  0][  0][  0]
        D10    D11   D12   D13   D14   D15   D16   D17   D18   D19   D1A   D1B
        [  0]  [  0][  0][  0][  0][  0][  0][  0][  0][  0][  0][  0]
        D20    D21   D22   D23   D24   D25   D26   D27   D28   D29   D2A   D2B
        [  0]  [  0][  0][  0][  0][  0][  0][  0][  0][  0][  0][  0]
```
⟵ 25

FIG. 3B

```
DE[0].bitmap = (0000000000000000)b = (0000)h
DE[1].bitmap = (0000000001000000)b = (0040)h
DE[2].bitmap = (0000000000000000)b = (0000)h
```
⟵ 24

```
PATH    P1      P2    P3    P4    P5    P6    P7
        [ 10]  [  0][  0][ 10][  0][  0][  0]
Disk    D00    D01   D02   D03   D04   D05   D06   D07   D08   D09   D0A   D0B
        [  0]  [  0][  0][  0][  0][  0][  0][  0][  0][  0][  0][  0]
        D10    D11   D12   D13   D14   D15   D16   D17   D18   D19   D1A   D1B
        [  0]  [  0][  0][  0][  0][  0][  0][  0][ 80][  0][  0][  0]
        D20    D21   D22   D23   D24   D25   D26   D27   D28   D29   D2A   D2B
        [  0]  [  0][  0][  0][  0][  0][  0][  0][  0][  0][  0][  0]
```
⟵ 25

FIG. 4A

```
DE[0].bitmap = (0000010000000000)b = (0400)h
DE[1].bitmap = (0000000001000000)b = (0040)h
DE[2].bitmap = (0000000000000000)b = (0000)h
```
⌐24

```
PATH    P1    P2    P3    P4    P5    P6    P7
       [130] [  0] [  0] [ 10] [  0] [  0] [  0]
Disk   D00   D01   D02   D03   D04   D05   D06   D07   D08   D09   D0A   D0B
       [  0] [  0] [  0] [  0] [  0] [ 80] [  0] [  0] [  0] [  0] [  0] [  0]
       D10   D11   D12   D13   D14   D15   D16   D17   D18   D19   D1A   D1B
       [  0] [  0] [  0] [  0] [  0] [  0] [  0] [  0] [  0] [ 80] [  0] [  0]
       D20   D21   D22   D23   D24   D25   D26   D27   D28   D29   D2A   D2B
       [  0] [  0] [  0] [  0] [  0] [  0] [  0] [  0] [  0] [  0] [  0] [  0]
```
⌐25

FIG. 4B

```
DE[0].bitmap = (0000010000000000)b = (0400)h
DE[1].bitmap = (0000000001000000)b = (0040)h
DE[2].bitmap = (1000000000000000)b = (8000)h
```
⌐24

```
PATH    P1    P2    P3    P4    P5    P6    P7
       [250] [  0] [  0] [ 10] [  0] [  0] [  0]
Disk   D00   D01   D02   D03   D04   D05   D06   D07   D08   D09   D0A   D0B
       [  0] [  0] [  0] [  0] [  0] [ 80] [  0] [  0] [  0] [  0] [  0] [  0]
       D10   D11   D12   D13   D14   D15   D16   D17   D18   D19   D1A   D1B
       [  0] [  0] [  0] [  0] [  0] [  0] [  0] [  0] [  0] [ 80] [  0] [  0]
       D20   D21   D22   D23   D24   D25   D26   D27   D28   D29   D2A   D2B
       [ 80] [  0] [  0] [  0] [  0] [  0] [  0] [  0] [  0] [  0] [  0] [  0]
```
⌐25

FIG. 5

```
DE[0].bitmap = (0000010000000000)b = (0400)h
DE[1].bitmap = (0000000001000000)b = (0040)h         — 24
DE[2].bitmap = (1000000000000000)b = (8000)h
```

```
PATH   P1    P2    P3    P4    P5    P6    P7
      [370] [  0] [  0] [ 10] [  0] [  0] [  0]
Disk   D00   D01   D02   D03   D04   D05   D06   D07   D08   D09   D0A   D0B
      [  0] [  0] [  0] [  0] [  0] [ 80] [  0] [  0] [  0] [  0] [  0] [  0]    — 25
       D10   D11   D12   D13   D14   D15   D16   D17   D18   D19   D1A   D1B
      [  0] [  0] [  0] [  0] [  0] [  0] [  0] [  0] [  0] [160] [  0] [  0]
       D20   D21   D22   D23   D24   D25   D26   D27   D28   D29   D2A   D2B
      [ 80] [  0] [  0] [  0] [  0] [  0] [  0] [  0] [  0] [  0] [  0] [  0]
```

FIG. 6

|            | PATH A RESULT   | PATH B RESULT   | ACTION                                                              |
|------------|-----------------|-----------------|---------------------------------------------------------------------|
| PATTERN 1  | NORMAL END      | NORMAL END      | SEPARATE Disk                                                       |
| PATTERN 2  | NORMAL END      | ABNORMAL END    | ADD THE NUMBER OF SCORES TO PATHS P3 AND P5 WITHOUT SEPARATING Disk |
| PATTERN 3  | ABNORMAL END    | NORMAL END      | ADD THE NUMBER OF SCORES TO PATHS P1 AND P4 WITHOUT SEPARATING Disk |
| PATTERN 4  | ABNORMAL END    | ABNORMAL END    | ADD THE NUMBER OF SCORES TO COMMON PATH P1 WITHOUT SEPARATING Disk  |

FIG. 8A

```
PATH   P1     P2    P3    P4    P5    P6    P7
       [  0]  [  0] [  0] [  0] [  0] [  0] [  0]
Disk   D00    D01   D02   D03   D04   D05   D06   D07   D08   D09   D0A   D0B
       [  0]  [  0] [  0] [  0] [  0] [  0] [  0] [  0] [  0] [  0] [  0] [  0]
       D10    D11   D12   D13   D14   D15   D16   D17   D18   D19   D1A   D1B
       [  0]  [  0] [  0] [  0] [  0] [  0] [  0] [  0] [  0] [  0] [  0] [  0]
       D20    D21   D22   D23   D24   D25   D26   D27   D28   D29   D2A   D2B
       [  0]  [  0] [  0] [  0] [  0] [  0] [  0] [  0] [  0] [  0] [  0] [  0]
```

FIG. 8B

```
PATH   P1     P2    P3    P4    P5    P6    P7
       [ 10]  [  0] [  0] [ 10] [  0] [  0] [  0]
Disk   D00    D01   D02   D03   D04   D05   D06   D07   D08   D09   D0A   D0B
       [  0]  [  0] [  0] [  0] [  0] [  0] [  0] [  0] [  0] [  0] [  0] [  0]
       D10    D11   D12   D13   D14   D15   D16   D17   D18   D19   D1A   D1B
       [  0]  [  0] [  0] [  0] [  0] [  0] [  0] [  0] [  0] [ 80] [  0] [  0]
       D20    D21   D22   D23   D24   D25   D26   D27   D28   D29   D2A   D2B
       [  0]  [  0] [  0] [  0] [  0] [  0] [  0] [  0] [  0] [  0] [  0] [  0]
```

FIG. 8C

```
PATH   P1     P2    P3    P4    P5    P6    P7
       [ 20]  [  0] [  0] [ 10] [  0] [  0] [  0]
Disk   D00    D01   D02   D03   D04   D05   D06   D07   D08   D09   D0A   D0B
       [  0]  [  0] [  0] [  0] [  0] [ 80] [  0] [  0] [  0] [  0] [  0] [  0]
       D10    D11   D12   D13   D14   D15   D16   D17   D18   D19   D1A   D1B
       [  0]  [  0] [  0] [  0] [  0] [  0] [  0] [  0] [  0] [ 80] [  0] [  0]
       D20    D21   D22   D23   D24   D25   D26   D27   D28   D29   D2A   D2B
       [  0]  [  0] [  0] [  0] [  0] [  0] [  0] [  0] [  0] [  0] [  0] [  0]
```

FIG. 8D

```
PATH   P1     P2    P3    P4    P5    P6    P7
       [ 30]  [  0] [  0] [ 20] [  0] [ 10] [  0]
Disk   D00    D01   D02   D03   D04   D05   D06   D07   D08   D09   D0A   D0B
       [  0]  [  0] [  0] [  0] [  0] [ 80] [  0] [  0] [  0] [  0] [  0] [  0]
       D10    D11   D12   D13   D14   D15   D16   D17   D18   D19   D1A   D1B
       [  0]  [  0] [  0] [  0] [  0] [  0] [  0] [  0] [  0] [ 80] [  0] [  0]
       D20    D21   D22   D23   D24   D25   D26   D27   D28   D29   D2A   D2B
       [ 80]  [  0] [  0] [  0] [  0] [  0] [  0] [  0] [  0] [  0] [  0] [  0]
```

FIG. 9A

```
PATH   P1    P2    P3    P4    P5    P6    P7
      [ 40] [  0][  0][ 30][  0][ 10][  0]
Disk   D00   D01   D02   D03   D04   D05   D06   D07   D08   D09   D0A   D0B
      [  0] [  0][  0][  0][  0][ 80][  0][  0][  0][  0][  0][  0]
       D10   D11   D12   D13   D14   D15   D16   D17   D18   D19   D1A   D1B
      [  0] [  0][  0][  0][  0][  0][  0][  0][  0][160][  0][  0]
       D20   D21   D22   D23   D24   D25   D26   D27   D28   D29   D2A   D2B
      [ 80] [  0][  0][  0][  0][  0][  0][  0][  0][  0][  0][  0]
```

FIG. 9B

```
PATH   P1    P2    P3    P4    P5    P6    P7
      [ 50] [  0][  0][ 30][  0][ 10][  0]
Disk   D00   D01   D02   D03   D04   D05   D06   D07   D08   D09   D0A   D0B
      [  0] [  0][  0][  0][  0][160][  0][  0][  0][  0][  0][  0]
       D10   D11   D12   D13   D14   D15   D16   D17   D18   D19   D1A   D1B
      [  0] [  0][  0][  0][  0][  0][  0][  0][  0][160][  0][  0]
       D20   D21   D22   D23   D24   D25   D26   D27   D28   D29   D2A   D2B
      [ 80] [  0][  0][  0][  0][  0][  0][  0][  0][  0][  0][  0]
```

FIG. 9C

```
PATH   P1    P2    P3    P4    P5    P6    P7
      [ 60] [  0][  0][ 40][  0][ 20][  0]
Disk   D00   D01   D02   D03   D04   D05   D06   D07   D08   D09   D0A   D0B
      [  0] [  0][  0][  0][  0][160][  0][  0][  0][  0][  0][  0]
       D10   D11   D12   D13   D14   D15   D16   D17   D18   D19   D1A   D1B
      [  0] [  0][  0][  0][  0][  0][  0][  0][  0][160][  0][  0]
       D20   D21   D22   D23   D24   D25   D26   D27   D28   D29   D2A   D2B
      [160] [  0][  0][  0][  0][  0][  0][  0][  0][  0][  0][  0]
```

FIG. 9D

```
PATH   P1    P2    P3    P4    P5    P6    P7
      [ 70] [  0][  0][ 50][  0][ 20][  0]
Disk   D00   D01   D02   D03   D04   D05   D06   D07   D08   D09   D0A   D0B
      [  0] [  0][  0][  0][  0][160][  0][  0][  0][  0][  0][  0]
       D10   D11   D12   D13   D14   D15   D16   D17   D18   D19   D1A   D1B
      [  0] [  0][  0][  0][  0][  0][  0][  0][  0][240][  0][  0]
       D20   D21   D22   D23   D24   D25   D26   D27   D28   D29   D2A   D2B
      [160] [  0][  0][  0][  0][  0][  0][  0][  0][  0][  0][  0]
```

FIG. 10A

```
PATH    P1     P2    P3    P4    P5    P6    P7
       [ 80] [  0][  0][ 50][  0][ 20][  0]
Disk    D00    D01   D02   D03   D04   D05   D06   D07   D08   D09   D0A   D0B
       [  0] [  0][  0][  0][  0][240][  0][  0][  0][  0][  0][  0]
        D10    D11   D12   D13   D14   D15   D16   D17   D18   D19   D1A   D1B
       [  0] [  0][  0][  0][  0][  0][  0][  0][  0][240][  0][  0]
        D20    D21   D22   D23   D24   D25   D26   D27   D28   D29   D2A   D2B
       [160] [  0][  0][  0][  0][  0][  0][  0][  0][  0][  0][  0]
```

FIG. 10B

```
PATH    P1     P2    P3    P4    P5    P6    P7
       [ 90] [  0][  0][ 60][  0][ 30][  0]
Disk    D00    D01   D02   D03   D04   D05   D06   D07   D08   D09   D0A   D0B
       [  0] [  0][  0][  0][  0][240][  0][  0][  0][  0][  0][  0]
        D10    D11   D12   D13   D14   D15   D16   D17   D18   D19   D1A   D1B
       [  0] [  0][  0][  0][  0][  0][  0][  0][  0][240][  0][  0]
        D20    D21   D22   D23   D24   D25   D26   D27   D28   D29   D2A   D2B
       [240] [  0][  0][  0][  0][  0][  0][  0][  0][  0][  0][  0]
```

FIG. 10C

```
PATH    P1     P2    P3    P4    P5    P6    P7
       [100] [  0][  0][ 70][  0][ 30][  0]
Disk    D00    D01   D02   D03   D04   D05   D06   D07   D08   D09   D0A   D0B
       [  0] [  0][  0][  0][  0][240][  0][  0][  0][  0][  0][  0]
        D10    D11   D12   D13   D14   D15   D16   D17   D18   D19   D1A   D1B
       [  0] [  0][  0][  0][  0][  0][  0][  0][  0][320][  0][  0]
        D20    D21   D22   D23   D24   D25   D26   D27   D28   D29   D2A   D2B
       [240] [  0][  0][  0][  0][  0][  0][  0][  0][  0][  0][  0]
```

DISK ARRAY APPARATUS, DISK ARRAY CONTROL METHOD AND DISK ARRAY CONTROLLER

CROSS-REFERENCE TO RELATED APPLICATIONS

This application claims the conventional priority based on Japanese Patent Application No. 2008-045451, filed on Feb. 27, 2008, the disclosures of which are incorporated herein by reference.

BACKGROUND OF THE INVENTION

1. Field of the Invention

An embodiment of the present invention relates to a disk array apparatus, a disk array control method, and a disk array controller, which may include a disk array apparatus, a disk array control method, and a disk array controller in which an abnormal path can be correctly degenerated when there occurs the path abnormality that looks like a disk abnormality.

2. Description of the Related Art

In a storage unit, a technique has been proposed that counts a number of detecting failures in every separable region, and determining and separating a region in which a trouble has occurred by a statistical analysis using a result of the count (refer to Japanese Patent Laid-Open No. 11-296311).

Also, in a disk array controller, a technique has been proposed in which a value of a management table is increased when a failure occurs, and, when the value exceeds a threshold, the concerned interface is separated (refer to Japanese Patent Laid-Open No. 10-275060).

Also, in a disk array apparatus, a technique has been proposed in which, when a failure occurs, points of the failure for the component is deducted, and, when the points is below a point reference value, the concerned component is degenerated (refer to Japanese Patent Laid-Open No. 2004-252692).

We have examined to degenerate not only the disks D00 to D2B but also a plurality of paths P1 to P7 by a statistical score addition processing for a disk array apparatus, as illustrated in FIG. 7. However, in a case of degenerating both the disk and the path by the statistical score addition processing, we have found that the following problem exists.

That is, in such disk array apparatus, it is assumed that the abnormality occurs on a path P1 (or P2) between a control unit RoC#0 and a switch unit BE Exp (SAS switch) contained in a controller module CM#0. In this case, even when access to any of the disks D00 to D2B is made, the control unit RoC#0 considers that an SAS error time-out occurs. The SAS error time-out is usually the error returned in a case of disk abnormality. Therefore, the control unit RoC#0 adds statistical scores, judging that the accessed disk is abnormal, and degenerates the concerned disk when the number of scores exceeds a threshold (corresponding to the case that the SAS error time-out occurs four times). The degenerate disk can not be reused unless the maintenance is performed.

Referring to FIGS. 8 to 10, a processing for degenerating the path abnormality or disk abnormality in the disk array apparatus of FIG. 7 will be described below.

Now, it is assumed that the path P1 between the control unit RoC#0 and the switch unit BE Exp#0 is abnormal. Due to this abnormality, the control unit RoC#0 considers that the same SAS error time-out occurred in a plurality of disks D00 to D2B. For example, for the sake of simpler explanation, it is assumed that the control unit RoC#0 considers that the errors occurred in the disks D19, D05, D20, D19, D05, D20, D19, D05, D20 and D19 in this order. The number 19 in "D19" designates the ID of the disk (same for others).

The number of scores for every path and disk in the statistical score addition table 25 is made "0" in an initial state of the disk array apparatus, as illustrated in FIG. 8A. When the number of scores for a path or disk exceeds "255" in the statistical score addition table 25, the concerned path or disk is separated (or degenerated).

Firstly, in the access from the control unit RoC#0 to the disk D19, the control unit RoC#0 detects the SAS error time-out. Accordingly, the control unit RoC#0 adds "10" to the paths P1 and P4 that are the paths from the control unit RoC#0 to the concerned disk D19, and adds "80" to the concerned disk D19 in the statistical score addition table 25. Since the SAS error time-out is the error returned in the case of the disk abnormality as described above, the sufficiently higher number of scores is added to the concerned disk than the concerned path. More specifically, the number of scores for disk is several times (eight times in this case) the number of scores for path. As a result, the statistical score addition table 25 is updated as illustrated in FIG. 8B. In these, the added parts are indicated with the underline (hereinafter the same for FIGS. 8C to 10).

Next, the control unit RoC#0 checks the updated statistical score addition table 25, and investigates whether or not there is any path or disk to be separated, namely, having the number of scores greater than or equal to "255". In this case, since there is no path or disk to be separated, the control unit RoC#0 performs subsequent access to the disk as usual.

Next, access to the plurality of disks is repeated in the same way as above, so that "10" is added to the concerned path and "80" is added to the concerned disk every time of the access. As a result, the statistical score addition table 25 is updated successively, and it is investigated whether or not there is any path or disk having the number of scores greater than or equal to "255" every time, as illustrated in FIGS. 8C to 10C.

That is, the statistical score addition table 25 is updated successively by access to the disk D05 as illustrated in FIG. 8C, by access to the disk D20 as illustrated in FIG. 8D, by access to the disk D19 as illustrated in FIG. 9A, by access to the disk D05 as illustrated in FIG. 9B, by access to the disk D20 as illustrated in FIG. 9C, by access to the disk D19 as illustrated in FIG. 9D, by access to the disk D05 as illustrated in FIG. 10A, by access to the disk D20 as illustrated in FIG. 10B, and by access to the disk D19 as illustrated in FIG. 10C.

When the control unit RoC#0 checks the statistical score addition table 25 of FIG. 10C, the number of scores of the disk D19 exceeds "255". Thus, the control unit RoC#0 separates (degenerates) the disk D19 from the concerned disk array.

As will be clear from the above, the path P1 between the control unit RoC#0 and the switch unit BE Exp#0, which is the essential abnormal part, can not be separated even after gaining access to the disk D the considerable number of times. On the other hand, the normal disk D19 is separated.

Further, after the disk D19 is separated, the number of scores in the statistical score addition table 25 is unchanged, so that other normal disks are also separated after the separation of the disk D19. For example, when the disk D05 is accessed after a state of FIG. 10C, the normal disk D05 is separated. The disk D20 is likewise separated. Accordingly, the same error occurs in every disk D while repeating access to the disk D, so that plural normal disks are degenerated. As a result, RAID is occluded, disabling the input/output processing for a host computer 1 to be performed, resulting in an abnormal job.

Properly, it is desirable that the control unit CM#0 is degenerated, retry is made via the path from the host computer 1 to the control unit CM#1, and access from the control unit CM#1 to the concerned disk D is made to continue the input/output processing. For this purpose, it is desirable that the disk D is not degenerated, but the correct abnormal part (or doubted part) is degenerated in the case of not disk abnormality.

SUMMARY OF THE INVENTION

One aspect of an object of the invention is to provide a disk array apparatus in which the correct abnormal part can be degenerated when there occurs an error that looks like the disk is abnormal during access to the disk.

Another aspect of an object of the invention is to provide a disk array control method in which the correct abnormal part can be degenerated when there occurs an error that looks like the disk is abnormal during access to the disk in the disk array apparatus.

Further aspect of an object of the invention is to provide a disk array controller in which the correct abnormal part can be degenerated when there occurs an error that looks like the disk is abnormal during access to the disk in the disk array apparatus.

This disk array apparatus includes a plurality of disks, an error table, a statistical score addition table, and a control unit. The error table stores information indicating occurrence of an error in the plurality of disks for each kind of error which can occur. The statistical score addition table stores a number of scores according to the error which occurs in the plurality of disks and on the read and write paths to the plurality of disks. The control unit judges, when an error occurs, whether or not information indicating the occurrence of the error is stored in the error table for the kind of the error. The control unit adds, when the information is not stored, first number of scores to a disk in which the error occurs, adds second number of scores smaller than the first number of scores to a path to the disk in which the error occurs in the statistical score addition table, and store information indicating the occurrence of the error for the disk in which the error occurs in the error table for the kind of the error. The control unit adds, when the information is stored, the first number of scores to the disk in which the error occurs, adds third number of scores larger than the first number of scores to the path to the disk in which the error occurs in the statistical score addition table, and store the information indicating the occurrence of the error for the disk in which the error occurs in the error table for the kind of the error. The control unit separates a path or disk of which a number of scores exceeds a predetermined threshold in the statistical score addition table from the disk array apparatus.

The disk array apparatus according to one embodiment has the control unit which makes the threshold for the path a smaller value than the threshold for the disk, and separates the path of which the number of scores exceeds the threshold of smaller value in the statistical score addition table from the disk array apparatus.

The disk array apparatus according to one embodiment has a control unit which issues, when separating the disk from the disk array apparatus, a predetermined instruction to the disk to be separated and decides whether or not to separate the disk from the disk array apparatus based on a response to the instruction.

This disk array control method controls a disk array apparatus including a plurality of disks, an error table for storing information indicating an occurrence of an error in the plurality of disks for each kind of error which can occur, a statistical score addition table storing the number of scores according to the error which occurs in the plurality of disks and on the read and write paths to the plurality of disks, and a control unit separating a predetermined path or disk from the disk array apparatus based on the error table and the statistical score addition table. In the disk array control method, the control unit judges, when an error occurs, whether or not information indicating the occurrence of the error is stored in the error table for the kind of the error. The control unit adds, when the information is not stored, first number of scores to a disk in which the error occurs, adds second number of scores smaller than the first number of scores to a path to the disk in which the error occurs in the statistical score addition table, and store information indicating the occurrence of the error for the disk in which the error occurs in the error table for the kind of the error. The control unit adds, when the information is stored, the first number of scores to the disk in which the error occurs, adds third number of scores larger than the first number of scores to the path to the disk in which the error occurs in the statistical score addition table, and store the information indicating the occurrence of the error for the disk in which the error occurs in the error table for the kind of the error. The control unit separates a path or disk of which a number of scores exceeds a predetermined threshold in the statistical score addition table from the disk array apparatus.

This disk array controller includes an error table, a statistical score addition table, and a control unit. The error table stores information indicating occurrence of an error in the plurality of disks for each kind of error which can occur. The statistical score addition table stores a number of scores according to the error which occurs in the plurality of disks and on the read and write paths to the plurality of disks. The control unit judges, when an error occurs, whether or not information indicating the occurrence of the error is stored in the error table for the kind of the error. The control unit adds, when the information is not stored, first number of scores to a disk in which the error occurs, adds second number of scores smaller than the first number of scores to a path to the disk in which the error occurs in the statistical score addition table, and store information indicating the occurrence of the error for the disk in which the error occurs in the error table for the kind of the error. The control unit adds, when the information is stored, the first number of scores to the disk in which the error occurs, adds third number of scores larger than the first number of scores to the path to the disk in which the error occurs in the statistical score addition table, and store the information indicating the occurrence of the error for the disk in which the error occurs in the error table for the kind of the error. The control unit separates a path or disk of which a number of scores exceeds a predetermined threshold in the statistical score addition table from the disk array apparatus.

With the disk array apparatus, the disk array control method and the disk array controller, when an error occurs, the second number of scores is added to the path to the disk (error disk) where the error occurs (or is estimated to occur) when the error of the same kind does not yet occur. When the error of the same kind already occurs, the third number of scores is added to the path. That is, the number of scores added to the path in which the abnormality is supposed to occur is temporarily changed (increased). More specifically, the number of scores added to the path is smaller than the first number of scores added to the error disk when the abnormality does not occur, or larger than the first number of scores when the abnormality occurs. And the path or disk of which the number of scores exceeds the predetermined threshold is separated from the disk array apparatus.

Thereby, before access to the disk is repeated multiple times, the normal disk is not separated, but the abnormal path which is the essential abnormal part can be separated (degenerated) from the disk array apparatus. Also, even when access to the disk is repeated multiple times, it is possible to prevent other normal disks from being separated. Further, the input/output processing can be continued by accessing (retrying) the disk in which (it looks like) the error occurs from another path. From the above, it is possible to prevent the same error from occurring in all the disks to degenerate plural normal disks while repeating access to the disk, and it is possible to prevent execution of the input/output processing of the host computer from being stopped due to RAID occlusion to cause a job abnormality.

According to one embodiment of the disk array apparatus, the threshold for path is smaller than the threshold for disk. Thereby, when the path is abnormal, the abnormal path can be separated from the disk array apparatus more promptly.

According to one embodiment of the disk array apparatus, when the disk is separated from the disk array apparatus, it is decided whether or not the disk is separated from the disk array apparatus based on a response to the instruction issued to the disk to be separated. Thereby, when the path is abnormal, the disk to be separated can be prevented from being separated, so that the abnormal path can be separated from the disk array apparatus.

BRIEF DESCRIPTION OF THE DRAWINGS

FIGS. 3 to 6 are explanatory views for detecting the path abnormality in the disk array apparatus of FIG. 1.

FIGS. 8 to 10 are explanatory views for detecting the path abnormality in the disk array apparatus of FIG. 7.

DETAILED DESCRIPTION OF THE PREFERRED EMBODIMENTS

Figure 1:
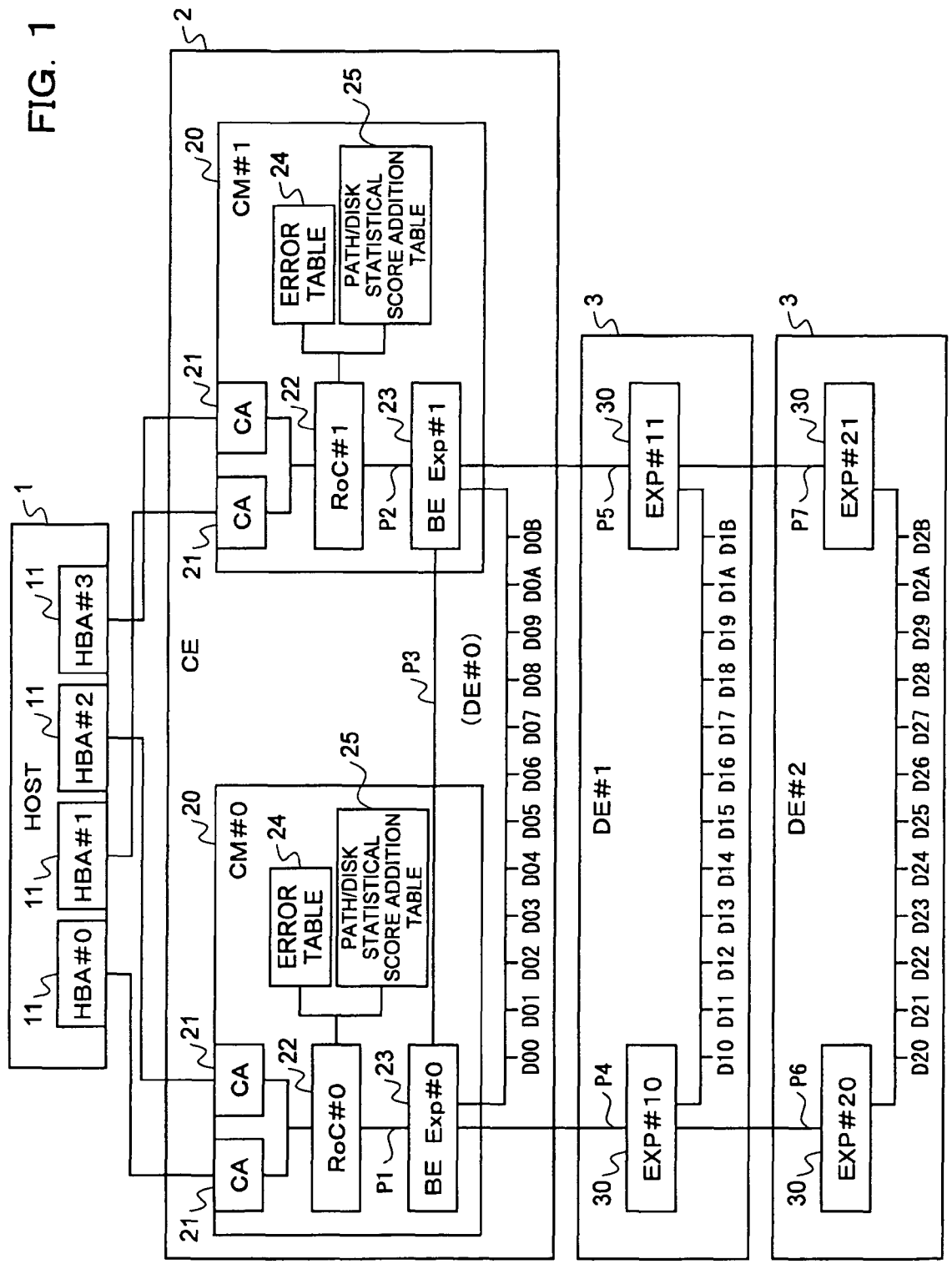
FIG. 1 is a diagram illustrating one example of the configuration of a disk array apparatus according to the present invention.

FIG. 1 is a diagram illustrating one example of the configuration of a disk array apparatus according to an embodiment of the present invention. The disk array apparatus (RAID unit) is connected to a host computer (HOST) 1, and includes a control device (control enclosure: CE) 2 and a disk enclosure (DE) 3. A plurality of disk enclosures 3 are provided, and connected in series to the control device 2. This disk array apparatus has a dual write and read path, as will be described later.

The host computer 1 asks (requests) a host bus adaptor (HBA) 11 to write or read data into or from the disk array apparatus, as well known. The host bus adaptor includes a channel control device, for example. The host computer 1 of this embodiment includes four host bus adaptors 11, for example, to have the dual write and read path. For example, the host bus adaptors HBA#0 and HBA#2 perform the write and read of the disk D having an even number of ID, and therefore are connected to a controller module CM#0. The host bus adaptors HBA#1 and HBA#3 perform the write and read of the disk D having an odd number of ID, and therefore are connected to a controller module CM#1.

When the individual host bus adaptors such as HBA#0 are distinguished, they are represented as "HBA#0". The others are represented in the same way.

The control device 2 is a disk array controller for controlling the entire disk array apparatus, and includes two controller modules (CM) 20 and a plurality of disks D00 to D0B. The data write and read path to all the disks D is made dual by two controller modules 20.

Each controller module 20 includes two channel adaptors (CA) 21, a control unit (RoC) 22 and a switch unit (BE Exp) 23. The control unit 22 includes an error table 24 and a path/disk statistical score addition table (hereinafter a statistical score addition table) 25. The data write and read path from the host computer 1 to the controller module 20 is made dual by two channel adaptors 21.

That is, two channel adaptors CA of the controller module CM#0 are connected to the host bus adaptors HBA#0 and HBA#2. Also, two channel adaptors CA of the controller module CM#1 are connected to the host bus adaptors HBA#1 and HBA#3. Thereby, the paths between the host computer 1 and the control units RoC#0 and RoC#1 are made dual (actually fourfold) as described above.

The control device 2 actually includes one disk enclosure 3 (DE#0). This disk enclosure DE#0 is connected to the top of the disk enclosures 3 connected in series. Two switch units (BE Exp) 23 and a plurality of disks D00 to D0B make up the disk enclosure 3 (DE#0) within the control device 2. This disk enclosure 3 (DE#0) only includes the path P3 connecting between two switch units (BE Exp) 23. Except for this point, the disk enclosure DE#0 has the same configuration as the disk enclosure DE#1 and so on. Also, the switch unit 23 has the same configuration as the switch unit 30, and includes an SAS (Serial Attached SCSI) switch, for example.

The disk enclosure 3 includes two switch units 30 (Exp), a path (DE inner path) connecting them, and a plurality of disks (e.g., magnetic disk units) connected to this DE inner path. The switch unit 30 includes an SAS switch, for example. The data write and read path to the disk D within the disk enclosure 3 is made dual by two switch units 30.

Each of the two switch units 30 are connected to the corresponding switch unit 30 in the other disk enclosure 3. For example, the switch unit BE Exp#0 is connected to the switch unit EXP#10, and the switch unit EXP#10 is connected to the switch unit EXP#20. Thereby, the plurality of disk enclosures 3 are connected in series, as described above.

In the disk enclosure 3, for the sake of simpler drawing, the symbol such as "D00" denotes one disk D, for example. The disk D00 is the disk having ID=00, for example. The ID of the disk D is identification information of the disk D, and is uniquely decided in the concerned disk array apparatus. In the ID "00" of the disk D, the upper digit represents the order (identification information) of the disk enclosure 3 to which the concerned disk D belongs, and the lower digit represents the order (identification information) of the concerned disk D in the concerned disk enclosure 3.

In this embodiment, one disk enclosure 3 is provided with twelve disks D. Also, in this embodiment, ten disk enclosures 3 are provided. Accordingly, the disk array apparatus of this embodiment includes 120 disks D. For the sake of simpler drawing, three disk enclosures 3 are only illustrated in FIG. 1. The disk D includes a hard disk drive, for example. The hard disk drive of this embodiment includes an SAS interface.

The hard disk drive may include other interfaces, for example, SATA (Serial ATA) or FC (Fibre Channel). In this case, since the kind of error is other than the SAS error time-out, the error table 24 is organized in accordance with the kind of error as defined in each interface. Also, the switch units 23 and 30 are changed to those for making the switching as defined in the pertinent interface.

Also, the disk D may be a non-volatile storage unit other than the hard disk drive, for example, a semiconductor disk using the non-volatile semiconductor memory (flash memory). That is, the disk D is not limited to the disk-like storage medium.

For example, the host bus adaptor 11 of the host computer 1 requests the control unit 22 to write or read data via the channel adaptor 21. Accordingly, the control unit 22 writes or reads the concerned data by accessing the disk D in which the concerned data is to be stored or is stored. At the time of this access, the write or read path is decided depending on the concerned disk D.

When the disk D is accessed in this way, the control unit 22 detects the occurrence of an error during access to the concerned disk by monitoring the response from the disk D, as well known. And, the control unit 22 judges whether or not the information indicating the occurrence of the error is stored in the concerned error table 24 by referring to the error table (called the concerned error table) 24 for the kind of the concerned error, when the error occurs. That is, it is investigated whether or not the error of the kind (same kind) of the concerned error already occurs in any disk D (including the disk D where the concerned error occurs, same below).

Figures 2A, 2B:
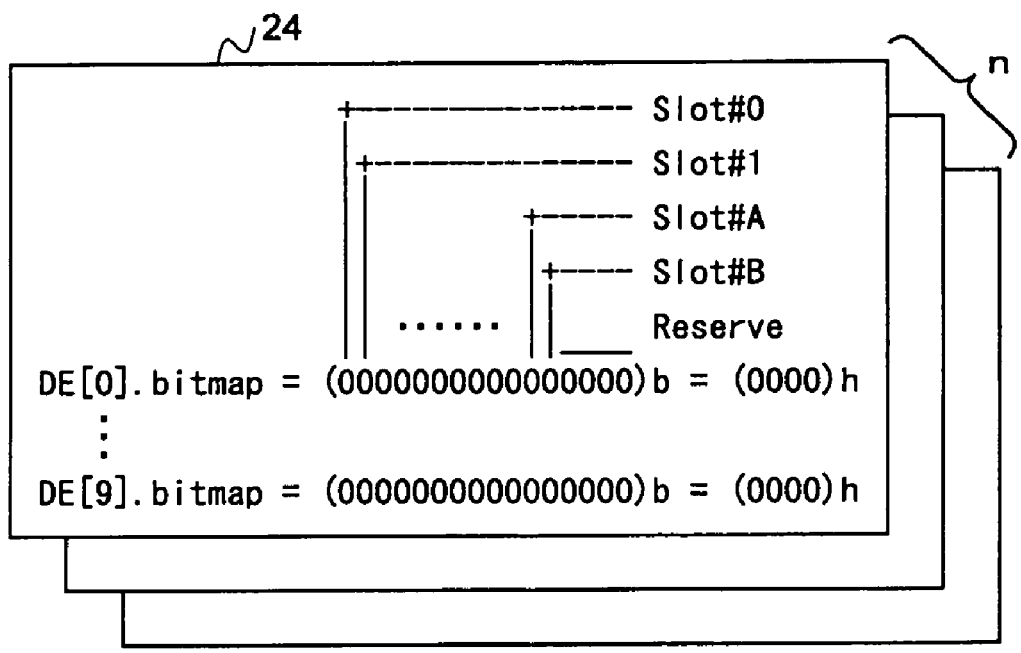
FIG. 2 is an explanatory view for explaining an error table and a statistical score addition table.
Figure 7:
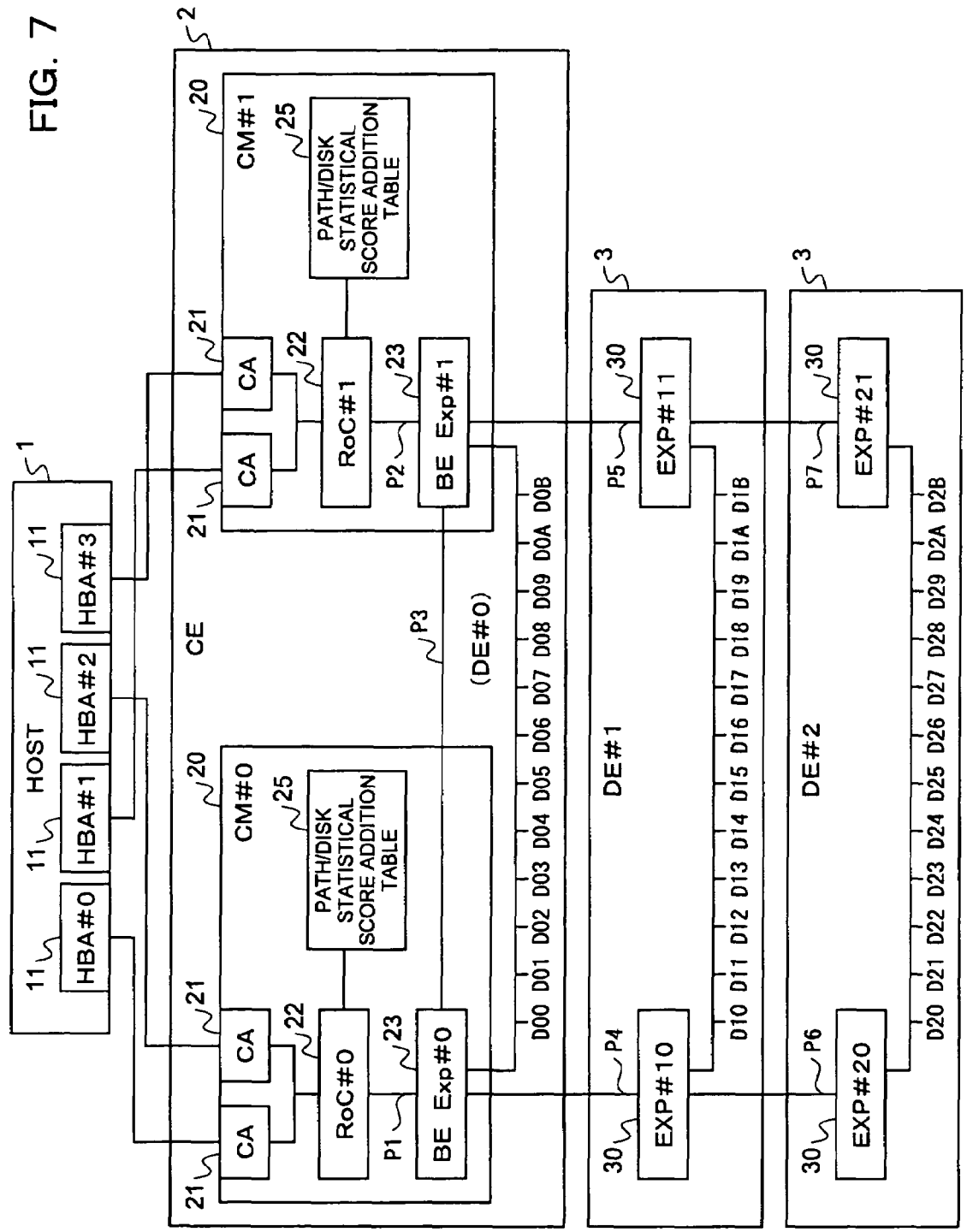
FIG. 7 is a block diagram illustrating the disk array apparatus examined by the present inventor.

FIG. 2A illustrates the organization of the error table 24. The error table 24 is useful to judge whether or not the same error occurs in the plurality of disks. For this reason, the error table 24 stores information indicating the occurrence of error in the plurality of disks D for each kind of error which can occur (which is able to occur). Accordingly, the error table 24 is provided for every kinds n of error which can occur in the concerned disk array apparatus. There are about 30 kinds of error. Accordingly, when there are 30 kinds of error, n is equal to 30.

There are the following kinds of error. That is, there are an error "SAS error time-out" which occurs in the disk, an error "Request Completed With Error" which occurs during frame transfer, an error "Data Overrun" which occurs due to data overrun, an error "Command Time-out" which occurs due to time-out, an error "Data Underrun" which occurs due to data underrun, and an error "Port Unavailable" which occurs when the designated port is unusable.

The error table 24 includes a bit map that can store information (error information) indicating the occurrence of each error for all the disks. That is, since the disk array apparatus has ten enclosures, the error table 24 has ten entries. One entry corresponds to one disk enclosure 3. The error information of one disk is managed by one bit. That is, when an error occurs in any disk D, the bit corresponding to the concerned disk D is put from "0" to "1".

The bit map of one entry is represented by binary number (b) of 16 digits or hexadecimal number (h) of four digits. In the bit map of one entry, the bits correspond in order from the top bit to the slots Slot#0 and so on. The slot Slot#0 corresponds to one disk D#X0. Herein, "X" is the ID of the concerned disk enclosure 3. Twelve bits from the top correspond to each disk D. The remaining four bits are spare bits (not used). Thereby, the error table 24 can list the presence or absence of the occurrence of the concerned error in all the disks D for each kind of error which can occur.

Also, the control unit 22 initializes the error table 24 periodically at a predetermined time interval. That is, all the bits are made "0". The predetermined time interval is 5 seconds, for example, and is empirically decided beforehand. Accordingly, the error table 24 is initialized for each kind of error which can occur by passing 5 seconds from the time when any bit is firstly made to "1" due to the occurrence of the concerned error.

Then, the control unit 22 performs a score addition processing (described later) at the normal time, even when the error of the same kind occurs after the initialization. Accordingly, in the statistical score addition table 25, the number of scores of the disk D (and path) which is not degenerated (or physically separated) remains unchanged, and the addition of scores is continued. Thus, when the disk D is abnormal, the concerned disk D can be correctly degenerated.

In this initialization processing, the control unit 22 may put the number of scores of the degenerated path and disk to "0" in the statistical score addition table 25.

When the information indicating the occurrence of the concerned error is not stored in the concerned error table 24, the control unit 22 performs the score addition processing at the normal time, judging that the error of the same kind does not yet occur. That is, the control unit 22 adds first number of scores to the disk D (hereinafter referred as error disk D) in which the concerned error occurs, and adds second number of scores smaller than the first number of scores to the path to the concerned error disk D, in the statistical score addition table 25. Further, the control unit 22 stores information indicating the occurrence of the error for the concerned error disk D in the error table 24 for the kind of the concerned error. That is, the bit corresponding to the concerned disk D is put to "1" (same below).

When the information indicating the occurrence of the concerned error is stored in the concerned error table 24, the control unit 22 performs the score addition processing at the abnormal time, judging that the error of the same kind already occurs. That is, the control unit 22 adds the first number of scores to the concerned error disk D, and adds third number of scores larger than the first number of scores to the path (path for addition) to the concerned error disk D, in the statistical score addition table 25. The control unit 22 extracts the path for addition before the addition. Further, the control unit 22 stores the information indicating the occurrence of error for the concerned error disk D in the error table 24 for the concerned error.

FIG. 2B illustrates the organization of the statistical score addition table 25. The statistical score addition table 25 stores the number of scores corresponding to the error which occurs in the plurality of disks and the read and write paths to them. The statistical score addition table 25 includes a path part 251 and a disk part 252. In FIG. 3 and following, both of them are integrally illustrated.

The path part 251 stores, for every concerned path, the number of scores (statistical scores added) according to the error which occurs (or is estimated to occur) on the concerned path for all the paths in the concerned disk array apparatus. For example, it stores the number of scores "10" for the path P1. The disk part 252 stores, for every concerned disk D, the number of scores (statistical scores added) according to the error which occurs (is estimated to occur) in the concerned disk D for all the disks D provided for the concerned disk array apparatus. For example, the number of scores "0" is stored for the disk D00.

The first and second numbers of scores are scores added at the normal time, and empirically decided beforehand when the threshold (described later) is determined. At this time, the first number of scores is made sufficiently larger than the second number of scores. Depending on various kinds of factor, the SAS error time-out is intrinsically the error indicating disk abnormality, so that the first number of scores is made larger, and the ratio is determined depending on the ratio of path trouble and disk trouble in the concerned disk array apparatus. For example, when the threshold is "255", the first number of scores is "80 (about one-third of the threshold) and the second number of scores is "10 (about ¹⁄₂₅ of the threshold).

The path for addition is the overlap path by comparing between the path from the control unit 22 to the concerned error disk and the path from the control unit 22 to any disk in which the same error as the concerned error occurs.

The third number of scores is the scores added at the abnormal time, and when the first number of scores is determined, is empirically decided beforehand based on the first number of scores. The third number of scores is made sufficiently larger than the first number of scores, and for example, it is "120" which is 1.5 times the first number of scores "80". This is because the same error as the concerned error already occurs, in which the probability that the abnormality occurs in the path is higher than the probability that the abnormality occurs in the disk. Thereby, the path abnormality can be detected more quickly.

As described above, the score addition processing at the abnormal time is the processing for adding the number of scores by temporarily increasing the number of scores to be added to the path from "10" to "120". Thereby, when the error occurs in one or more disks D, the concerned path can be degenerated, judging that the path leading to the concerned disk is abnormal, or when the error occurs in the specific disk D only, the concerned disk D can be degenerated, judging that the disk is abnormal (faulty).

Thereafter, the control unit 22 extracts the path or disk of which the number of scores exceeds the predetermined threshold in the statistical score addition table 25 by investigating the statistical score addition table 25 and separates this extracted path or disk from the concerned disk array apparatus. In this way, the control unit 22 can separates the predetermined path or disk from the concerned disk array apparatus, based on the error table 24 and the statistical score addition table 25.

As described above, when the error of the same kind occurs in this disk array apparatus in the disk access, the addition of the number of scores to the statistical score addition table 25 contributes to the path (separation of path) rather than the disk (separation of disk). Thereby, the path can be separated prior to the disk. Accordingly, the concerned disk can be retried via another path (the host computer 1 or other internal path), preventing the RAID occlusion from occurring due to separation of the plurality of disks D, and continuing the input/output instruction of the host computer 1.

Referring to FIGS. 3 to 5, a processing for correctly degenerating the path abnormality that looks like the disk abnormality in the disk array apparatus of FIG. 1 will be described below. Though the control unit RoC#0 performs the processing in this embodiment, the control unit RoC#1 may also perform the processing in the same way. Also, though the abnormality of the path P1 is detected in this embodiment, the abnormality of other paths P2 and so on may be detected in the same way.

Now, it is assumed that there is abnormality (on the path P1) between the control unit RoC#0 and the switch unit BE Exp#0. Due to this abnormality, the control unit RoC#0 considers (recognizes) that the same error (SAS error time-out) occurred in the plurality of disks D. For the sake of simpler explanation, it is assumed that the control unit RoC#0 gains access to three disks, including the disk D19 (DE#1/Slot#9) with ID=19, the disk D05 (DE#0/Slot#5) with ID=05 and the disk D20 (DE#2/Slot#0) with ID=20 in this order, for example. In this case, the control unit RoC#0 considers that the error occurred in the three disks in the above order.

In an initial state of the disk array apparatus, all the bits in the error table 24 for the SAS error time-out are made "0", and the numbers of scores for all paths and disks in the statistical score addition table 25 are made "0", as illustrated in FIG. 3A.

When the number of scores for path or disk exceeds "255" in the statistical score addition table 25, the concerned path or disk is separated (degenerated). That is, "255" is a threshold for separating the path or disk. This threshold is used in the processing for separating (or degenerating) the disk.

The error table 24 for SAS error time-out is only illustrated in FIGS. 3 to 5.

Firstly, in the access from the control unit RoC#0 to the disk D19, the control unit RoC#0 detects the SAS error time-out. Actually, the path P1 is abnormal and the disk D19 is not abnormal. However, the control unit RoC#0 recognizes that the SAS error time-out occurs in the disk D19. At this point in time, the control unit RoC#0 can not detect that the path P1 is abnormal.

In accordance with the detection of the SAS error time-out, the control unit RoC#0 checks the error table 24 for the SAS error time-out of FIG. 3A (hereinafter simply referred to as the error table 24), and investigates whether or not the same error as the concerned error occurs in any other disk than the concerned disk D19. Thereby, the control unit RoC#0 judges that the same error as the concerned error does not occur in any disk, because all the bits are "0" at this point in time.

Thus, the control unit RoC#0 performs a predetermined processing for the error table 24, and performs a processing at the normal time (where no abnormality is detected) for the statistical score addition table 25. That is, the bit of the concerned disk D19 is put to "1" in the error table 24. Also, the first number of scores "80" is added to the concerned disk D19 in the statistical score addition table 25. Also, the path for addition is obtained in the path from the control unit RoC#0 to the concerned disk D19, and the second number of scores "10" is added to the path for addition in the statistical score addition table 25.

The paths for addition in this case are the path "P1" and path "P4" from the control unit RoC#0 to the concerned disk D19 because the same error as the concerned error does not occur.

Thereby, the updated error table 24 and statistical score addition table 25 are obtained, as illustrated in FIG. 3B. In these, the added parts are indicated with the underline (hereinafter same in FIGS. 4 and 5).

Thereafter, the control unit RoC#0 checks the updated statistical score addition table 25, and investigates whether or not there is the path or disk to be separated. That is, it is investigated whether or not there is the path or disk having the number of scores greater than or equal to "255" in the statistical score addition table 25. In this case, since there is no path or disk to be separated, the control unit RoC#0 performs subsequent access to the disk as usual.

Then, in the access from the control unit RoC#0 to the disk D05, the control unit RoC#0 detects the SAS error time-out. Accordingly, the control unit RoC#0 checks the error table 24 (FIG. 3B), and investigates whether or not the same error as the concerned error occurs in the disks other than the concerned disk D05. Thereby, the control unit RoC#0 judges that the same error as the concerned error occurs in the concerned disk D19 because the bit of the other disk D19 is "1" at this point in time.

Thus, the control unit RoC#0 performs a predetermined processing for the error table 24, and performs a processing at the abnormal time (where abnormality is detected) for the statistical score addition table 25. That is, the bit of the concerned disk D05 is put to "1" in the error table 24. Also, the path for addition is obtained in the path from the control unit RoC#0 to the concerned disk D05, and then the third number of scores is added to the path for addition and the first number of scores ("80") is added to the concerned disk D05.

Here, the path for addition is the overlap path by comparing between the path to the disk D05 and the path to the other disk D19, and therefore the path "P1".

Thereby, the updated error table 24 and statistical score addition table 25 are obtained, as illustrated in FIG. 4A. Thereafter, the control unit RoC#0 checks the updated statistical score addition table 25, judges that there is no path or disk to be separated, and performs subsequent access to the disk as usual.

Then, in the access from the control unit RoC#0 to the disk D20, the control unit RoC#0 detects the SAS error time-out. Accordingly, the control unit RoC#0 checks the error table 24 (FIG. 4A), and judges that the same error as the concerned error occurs in the concerned disk D05. Since the control unit RoC#0 checks the error table 24 in order from the top (disk D00), it detects the bit "1" of the disk D05 before the disk D19, and ends checking the error table 24 at the time of detecting the bit "1".

The control unit RoC#0 performs a predetermined processing for the error table 24, and performs a processing at the abnormal time for the statistical score addition table 25. That is, the bit of the concerned disk D20 is put to "1" in the error table 24. Also, the path for addition "P1" is obtained in the path from the control unit RoC#0 to the concerned disk D20 in the statistical score addition table 25, and then the third number of scores "120" is added to this path and the first number of scores "80" is added to the concerned disk D20.

Thereby, the updated error table 24 and statistical score addition table 25 are obtained, as illustrated in FIG. 4B. Thereafter, the control unit RoC#0 checks the updated statistical score addition table 25, judges that there is no path or disk to be separated, and performs subsequent access to the disk as usual.

Then, in the access from the control unit RoC#0 to the disk D19, the control unit RoC#0 detects the SAS error time-out. Accordingly, the control unit RoC#0 checks the error table 24 (FIG. 4B), and judges that the same error as the concerned error occurs in the concerned disk D05.

The control unit RoC#0 performs a predetermined processing for the error table 24, and performs a processing at the abnormal time for the statistical score addition table 25. That is, the bit of the concerned disk D19 is put to "1" in the error table 24. Actually, the concerned bit "1" is overwritten with the new value "1", and not changed. Also, the path for addition "P1" is obtained in the path from the control unit RoC#0 to the concerned disk D19 in the statistical score addition table 25, and then the third number of scores "120" is added to this path and the first number of scores "80" is added to the concerned disk D19.

Thereby, the updated error table 24 and statistical score addition table 25 are obtained, as illustrated in FIG. 5. Thereafter, the control unit RoC#0 checks the updated statistical score addition table 25, and investigates whether or not there is the path or disk to be separated. In this case, it is detected that the number of scores "370" for the path P1 between the control unit RoC#0 and the switch unit BE Expt#0 in the statistical score addition table 25 exceeds the threshold "255". Thus, the control unit RoC#0 judges that the essential trouble part (correctly the doubted part) is the path "P1".

The control unit RoC#0 logically separates (degenerates) the concerned path P1 and the switch unit BE Exp#0 connected to this path from the concerned disk array apparatus by well known means. Thereby, the control unit RoC#0 judges that the essential trouble part could be normally separated.

The following can be found from the comparison between the processing as illustrated in FIGS. 3 to 5 and the processing as illustrated in FIGS. 8 to 10.

That is, the path P1 between the control unit RoC#0 and the switch unit BE Exp#0, which is the essential trouble part, can be correctly detected by the processing as illustrated in FIGS. 3 to 5. On the contrary, the path P1 can not be correctly detected by gaining access to the disk multiple times by the processing as illustrated in FIGS. 8 to 10. Thus, there is inconvenience that the essentially normal disk is degenerated. Accordingly, the processing as illustrated in FIGS. 3 to 5 can detect the essential trouble part more correctly, and prevent undesirable degeneration of the disk.

There are four accesses to the disk by the processing as illustrated in FIGS. 3 to 5 until the path P1 which is the essential trouble part is detected. On the contrary, the concerned path P1 can not be detected even after ten accesses by the processing as illustrated in FIGS. 8 to 10. Accordingly, the processing as illustrated in FIGS. 3 to 5 can detect the essential trouble part more quickly.

Though the disk array apparatus has been described above based on the embodiment, this disk array apparatus may be varied in various forms within the spirit or scope of the invention.

For example, the number of scores added to the path is temporarily increased from "80" to "120" in the embodiment of FIG. 1, but instead of (or in addition to) this, the threshold of the number of scores of the path may be temporarily changed from "255" to a smaller number of scores, e.g., "200". That is, the control unit 22 makes the threshold for the path a smaller value than the threshold for the disk, and separates the path of which the number of scores exceeds the threshold of smaller value in the path/disk statistical score addition table 25 from the concerned disk array apparatus.

More specifically, when the control unit 22 (e.g., control unit RoC#0) checks the error table 24, and judges that the same error as the concerned error occurs, the threshold for the concerned error is changed from "255" to the smaller value "200". In this case, the threshold of the number of scores of the disk is kept "255". Thereby, the disk abnormality can be detected as usual, and the concerned path P1 and the switch unit BE Exp#0 connected to this can be degenerated more quickly at the time when the statistical score addition table 25 is updated (the number of scores is changed to "250") as illustrated in FIG. 4B.

Though the concerned path or disk is separated when the number of scores of the path or disk exceeds the threshold in the embodiment of FIG. 1, a final judgment processing for judging whether or not to separate the disk may be performed before the processing for separating the disk. That is, when the control unit 22 separates the disk from the concerned disk array apparatus, a predetermined instruction is issued to the disk to be separated, and it is decided whether or not to separate the disk from the concerned disk array apparatus based on a response to this instruction.

More specifically, the control unit 20 (e.g., control unit RoC#0) issues a plurality of I/O (Test Unit Ready) instructions to the switch unit BE Exp to which the concerned disk is connected, before the number of scores of the disk exceeds the threshold and the disk is separated. Two I/O (Test Unit Ready) instructions are issued because the path to each disk is dual. For example, when the number of scores of the disk D19 exceeds the threshold, the control unit RoC#0 issues the I/O (Test Unit Ready) instructions via the path P1 and path P4 (path A) to the switch unit BE Exp (EXP#10) and issues the I/O (Test Unit Ready) instructions via the path P1, path P3 and path P5 (path B) to the switch unit BE Exp (EXP#11). The control unit RoC#0 judges whether or not to separate the disk, based on the responses to two I/O (Test Unit Ready) instructions, as illustrated in FIG. 6.

In a case of pattern 1, two instructions are normally returned via the path A and path B, so that there is no abnormality in the disk, path A and path B. Accordingly, the control unit RoC#0 separates the concerned disk. In a case of pattern 2, the instruction is normally returned via the path A, so that there is no abnormality in the disk and the path A. Accordingly, the control unit RoC#0 adds the number of scores "120" to the paths P3 and P5 making up the path B, not the path A, without separating the concerned disk. In a case of pattern 3, which is inverse to the pattern 2, the control unit RoC#0 adds the number of scores "120" to the paths P1 and P4 making up the path A, not the path B, without separating the concerned disk. In a case of pattern 4, two instructions are returned abnormally, so that there is high probability that the path P1 common to the paths A and B, but not the disk, is abnormal. Accordingly, the control unit RoC#0 adds the number of scores "120" to the path P1 without separating the concerned disk.

Thereby, the disk abnormality can be detected as usual, and it is necessary to issue the predetermined instruction and wait for the response, but the concerned path P1 and the switch unit BE Exp#0 connected to this can be degenerated more quickly and correctly.

According to the disk array apparatus, the disk array control method and the disk array controller as described above, when the error of the same kind already occurs, the number of scores to be added to the path in which the abnormality is supposed to occur is temporarily increased. Thus, it is possible to separate the abnormal path which is the essential abnormal part from the disk array apparatus without separating the normal disk, thereby preventing other normal disks from being separated. As a result, it is possible to access (retry) the disk in which (it looks like) the error occurs from another path and continue the input/output processing. As a result, it is possible to prevent a plurality of normal disks from being degenerated to cause RAID occlusion and stop the execution of the input/output processing of the host computer to cause job abnormality, while repeating the access to the disk.

What is claimed is:

1. A disk array apparatus comprising:
    a plurality of disks;
    an error table storing information indicating occurrence of an error in the plurality of disks for each kind of error which can occur;
    a statistical score addition table storing a number of scores according to the error which occurs in the plurality of disks and on the read and write paths to the plurality of disks; and
    a control unit,
    wherein the control unit judges, when an error occurs, whether or not information indicating the occurrence of the error is stored in the error table for the kind of the error,
    wherein the control unit adds, when the information is not stored, first number of scores to a disk in which the error occurs, adds second number of scores smaller than the first number of scores to a path to the disk in which the error occurs in the statistical score addition table, and store information indicating the occurrence of the error for the disk in which the error occurs in the error table for the kind of the error,
    wherein the control unit adds, when the information is stored, the first number of scores to the disk in which the error occurs, adds third number of scores larger than the first number of scores to the path to the disk in which the error occurs in the statistical score addition table, and store the information indicating the occurrence of the error for the disk in which the error occurs in the error table for the kind of the error, and
    wherein the control unit separates a path or disk of which a number of scores exceeds a predetermined threshold in the statistical score addition table from the disk array apparatus.

2. The disk array apparatus according to claim 1, wherein the control unit makes the threshold for the path a smaller value than the threshold for the disk, and separates the path of which the number of scores exceeds the threshold of smaller value in the statistical score addition table from the disk array apparatus.

3. The disk array apparatus according to claim 1, wherein, when separating the disk from the disk array apparatus, the control unit issues a predetermined instruction to the disk to be separated, and decides whether or not to separate the disk from the disk array apparatus based on a response to the instruction.

4. A disk array control method for controlling a disk array apparatus comprising a plurality of disks, an error table for storing information indicating an occurrence of an error in the plurality of disks for each kind of error which can occur, a statistical score addition table storing the number of scores according to the error which occurs in the plurality of disks and on the read and write paths to the plurality of disks, and a control unit separating a predetermined path or disk from the disk array apparatus based on the error table and the statistical score addition table; the method comprising:
    judging, when an error occurs, whether or not information indicating the occurrence of the error is stored in the error table for the kind of the error in the control unit;
    adding, in the control unit, when the information is not stored, first number of scores to a disk in which the error occurs, adding second number of scores smaller than the first number of scores to a path to the disk in which the error occurs in the statistical score addition table, and storing information indicating the occurrence of the error for the disk in which the error occurs in the error table for the kind of the error;
    adding, in the control unit, when the information is stored, the first number of scores to the disk in which the error occurs, adding third number of scores larger than the first number of scores to the path to the disk in which the error occurs in the statistical score addition table, and storing the information indicating the occurrence of the error for the disk in which the error occurs in the error table for the kind of the error; and
    separating a path or disk of which a number of scores exceeds a predetermined threshold in the statistical score addition table from the disk array apparatus by the control unit.

5. The disk array control method according to claim 4, further comprising:
    making the threshold for the path a smaller value than the threshold for the disk by the control unit,
    wherein the control unit separates the path of which the number of scores exceeds the threshold of smaller value in the statistical score addition table from the disk array apparatus.

6. The disk array control method according to claim 4, further comprising:
    issuing, when separating the disk from the disk array apparatus, a predetermined instruction to the disk to be separated by the control unit; and deciding by the control unit whether or not to separate the disk from the disk array apparatus based on a response to the instruction.

7. A disk array controller comprising:

an error table storing information indicating occurrence of an error in the plurality of disks for each kind of error which can occur;

a statistical score addition table storing a number of scores according to the error which occurs in the plurality of disks and on the read and write paths to the plurality of disks; and a control unit, wherein the control unit judges, when an error occurs, whether or not information indicating the occurrence of the error is stored in the error table for the kind of the error, wherein the control unit adds, when the information is not stored, first number of scores to a disk in which the error occurs, adds second number of scores smaller than the first number of scores to a path to the disk in which the error occurs in the statistical score addition table, and store information indicating the occurrence of the error for the disk in which the error occurs in the error table for the kind of the error, wherein the control unit adds, when the information is stored, the first number of scores to the disk in which the error occurs, adds third number of scores larger than the first number of scores to the path to the disk in which the error occurs in the statistical score addition table, and store the information indicating the occurrence of the error for the disk in which the error occurs in the error table for the kind of the error, and wherein the control unit separates a path or disk of which a number of scores exceeds a predetermined threshold in the statistical score addition table from the disk array apparatus.

8. The disk array controller according to claim 7, wherein the control unit makes the threshold for the path a smaller value than the threshold for the disk, and separates the path of which the number of scores exceeds the threshold of smaller value in the statistical score addition table from the disk array apparatus.

9. The disk array controller according to claim 7, wherein, when separating the disk from the disk array apparatus, the control unit issues a predetermined instruction to the disk to be separated, and decides whether or not to separate the disk from the disk array apparatus based on a response to the instruction.

* * * * *